(12) United States Patent
Ooi et al.

(10) Patent No.: US 11,107,602 B2
(45) Date of Patent: *Aug. 31, 2021

(54) ELECTRIC WIRE CONDUCTOR, COVERED ELECTRIC WIRE, AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hayato Ooi, Yokkaichi (JP); Yasuyuki Ootsuka, Yokkaichi (JP); Kinji Taguchi, Yokkaichi (JP); Toru Tanji, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 56 days.

This patent is subject to a terminal disclaimer.

(21) Appl. No.: 16/342,481

(22) PCT Filed: Mar. 29, 2017

(86) PCT No.: PCT/JP2017/012924
§ 371 (c)(1),
(2) Date: Apr. 16, 2019

(87) PCT Pub. No.: WO2018/087944
PCT Pub. Date: May 17, 2018

(65) Prior Publication Data
US 2020/0273601 A1    Aug. 27, 2020

(30) Foreign Application Priority Data

Nov. 8, 2016 (JP) .............................. JP2016-218236
Feb. 10, 2017 (JP) .............................. JP2017-022905

(51) Int. Cl.
*H01B 5/08*        (2006.01)
*H01B 7/00*        (2006.01)
(Continued)

(52) U.S. Cl.
CPC ........... *H01B 7/0045* (2013.01); *H01B 1/023* (2013.01); *H01B 1/026* (2013.01); *H01B 5/08* (2013.01);
(Continued)

(58) Field of Classification Search
CPC .................................... H01B 5/08; H01B 7/08
See application file for complete search history.

(56) References Cited

U.S. PATENT DOCUMENTS 3,860,744 A * 1/1975 Schuler ................... H02K 3/34
                                                                174/117 FF
3,876,823 A    4/1975 Penczynski
(Continued)

FOREIGN PATENT DOCUMENTS

DE          2014959 A    11/1970
DE          69514750 T2   6/2000
(Continued)

OTHER PUBLICATIONS

Dec. 4, 2019 Office Action issued in Chinese Patent Application No. 201780055581.0.
(Continued)

*Primary Examiner* — Chau N Nguyen
(74) *Attorney, Agent, or Firm* — Oliff PLC

(57) ABSTRACT

An electric wire conductor capable of achieving both flexibility and a space-saving property, a covered electric wire
(Continued)

and a wiring harness including such an electric wire conductor. The electric wire conductor contains a wire strand containing a plurality of elemental wires twisted together, and has a flat portion where a cross-section intersecting an axial direction of the wire strand has a flat shape. A covered electric wire contains the electric wire conductors and an insulator covering the electric wire conductors. A wiring harness contains such covered electric wires.

13 Claims, 6 Drawing Sheets

(51) Int. Cl.
| | |
|---|---|
| *H01B 7/08* | (2006.01) |
| *H01B 7/29* | (2006.01) |
| *H01B 1/02* | (2006.01) |
| *H01B 13/012* | (2006.01) |
| *H02G 3/36* | (2006.01) |
| *B60R 16/02* | (2006.01) |

(52) U.S. Cl.
CPC .............. *H01B 7/0009* (2013.01); *H01B 7/08* (2013.01); *H01B 7/292* (2013.01); *H01B 13/01209* (2013.01); *H02G 3/36* (2013.01); *B60R 16/0207* (2013.01)

(56) References Cited

U.S. PATENT DOCUMENTS

| | | | |
|---|---|---|---|
| 4,079,187 A | 3/1978 | Fillunger et al. | |
| 4,195,199 A | 3/1980 | Hillmann et al. | |
| 4,329,539 A | 5/1982 | Tanaka et al. | |
| 4,336,420 A | 6/1982 | Benz | |
| 4,439,256 A | 3/1984 | Meserve | |
| 4,537,642 A | 8/1985 | Saito et al. | |
| 4,611,390 A | 9/1986 | Tanaka et al. | |
| 4,652,697 A | 3/1987 | Ando et al. | |
| 4,857,675 A | 8/1989 | Marancik et al. | |
| 4,965,245 A | 10/1990 | Sugimoto et al. | |
| 4,994,633 A | 2/1991 | Puhn | |
| 5,057,489 A | 10/1991 | Ohkawa et al. | |
| 5,068,219 A | 11/1991 | Hagino et al. | |
| 5,073,679 A | 12/1991 | Bencharab et al. | |
| 5,135,596 A | 8/1992 | Pabsch et al. | |
| 5,187,859 A | 2/1993 | Heim | |
| 5,260,516 A | 11/1993 | Blackmore | |
| 5,330,969 A | 7/1994 | Finnemore et al. | |
| 5,541,380 A | 7/1996 | Ogden et al. | |
| 5,801,124 A | 9/1998 | Gamble et al. | |
| 5,885,938 A | 3/1999 | Otto et al. | |
| 5,929,000 A | 7/1999 | Hahakura et al. | |
| 6,192,573 B1 | 2/2001 | Hahakura et al. | |
| 6,247,225 B1 | 6/2001 | Snitchler et al. | |
| 6,271,474 B1 | 8/2001 | Fujikami et al. | |
| 6,273,161 B1 | 8/2001 | Yamagami et al. | |
| 6,284,979 B1 | 9/2001 | Malozemoff et al. | |
| 6,430,348 B1 | 8/2002 | Asano et al. | |
| 6,442,827 B1 | 9/2002 | Herrmann et al. | |
| 6,471,785 B1 | 10/2002 | Fischer et al. | |
| 6,510,604 B1 | 1/2003 | Pourrahimi | |
| 6,571,453 B1 | 6/2003 | Kautz et al. | |
| 7,162,287 B2 | 1/2007 | Ayai | |
| 8,878,068 B2 * | 11/2014 | Goto .................... | H01B 7/0009 174/128.1 |
| 9,440,272 B1 * | 9/2016 | Herrin ................... | B21B 1/16 |
| 9,514,863 B2 | 12/2016 | Fukuda et al. | |
| 10,256,012 B2 | 4/2019 | Masui et al. | |
| 10,658,092 B2 * | 5/2020 | Ooi ........................ | H01B 7/04 |
| 2002/0043298 A1 | 4/2002 | Kaneko et al. | |
| 2002/0050395 A1 | 5/2002 | Kusumoto et al. | |
| 2003/0032560 A1 | 2/2003 | Otto et al. | |
| 2005/0103519 A1 | 5/2005 | Brandsberg et al. | |
| 2005/0162032 A1 * | 7/2005 | El-Gabry ............... | H02K 3/12 310/179 |
| 2007/0197396 A1 | 8/2007 | Holcomb | |
| 2008/0128153 A1 | 6/2008 | Lietz | |
| 2008/0230269 A1 * | 9/2008 | Susai ..................... | H01R 4/188 174/84 C |
| 2009/0266575 A1 * | 10/2009 | Yoshimoto ........... | H01B 7/0009 174/110 R |
| 2009/0315419 A1 * | 12/2009 | Mita ..................... | H01R 43/05 310/71 |
| 2010/0288529 A1 | 11/2010 | Hayashishita et al. | |
| 2011/0120747 A1 | 5/2011 | Muneyasu et al. | |
| 2012/0220465 A1 | 8/2012 | Tanaka et al. | |
| 2012/0244365 A1 | 9/2012 | Chen et al. | |
| 2012/0261185 A1 | 10/2012 | Murao et al. | |
| 2012/0305308 A1 | 12/2012 | Toyama et al. | |
| 2014/0116750 A1 | 5/2014 | Suzuki et al. | |
| 2014/0197709 A1 * | 7/2014 | Hasegawa ............ | H01B 5/08 310/179 |
| 2014/0274726 A1 | 9/2014 | Sugimoto et al. | |
| 2014/0350350 A1 | 11/2014 | Imagawa et al. | |
| 2014/0367143 A1 | 12/2014 | Abe et al. | |
| 2015/0060135 A1 | 3/2015 | Handel et al. | |
| 2015/0122545 A1 | 5/2015 | Uchida | |
| 2016/0133356 A1 | 5/2016 | Kondo | |
| 2016/0343475 A1 * | 11/2016 | Hirao ..................... | H01B 13/06 |
| 2016/0372231 A1 | 12/2016 | Yabe | |
| 2017/0345526 A1 | 11/2017 | Jones et al. | |
| 2018/0226174 A1 | 8/2018 | Rose | |
| 2018/0268959 A1 | 9/2018 | Kim et al. | |

FOREIGN PATENT DOCUMENTS

| | | |
|---|---|---|
| EP | 2662866 A2 | 11/2013 |
| GB | 1193420 A | 6/1970 |
| JP | S52-074877 A | 6/1977 |
| JP | S63-158710 A | 7/1988 |
| JP | H04-065035 A | 3/1992 |
| JP | 2009065045 A | 3/2009 |
| JP | 2009-087868 A | 4/2009 |
| JP | 2011-134667 A | 7/2011 |
| JP | 2011-165354 A | 8/2011 |
| JP | 2012147509 A | 8/2012 |
| JP | 2014-022056 A | 2/2014 |
| JP | 2014-112469 A | 6/2014 |
| JP | 2014-130739 A | 7/2014 |
| JP | 2015-167114 A | 9/2015 |
| JP | 2016-131139 A | 7/2016 |
| TW | 201439388 A | 10/2014 |
| WO | 99/49475 A1 | 9/1999 |
| WO | 2010/016328 A1 | 2/2010 |

OTHER PUBLICATIONS

Sep. 20, 2019 Office Action issued in U.S. Appl. No. 16/342,505.
Jul. 14, 2020 Office Action issued in Chinese Patent Application No. 201780055581.0.
May 20, 2020 Office Action issued in Indian Patent Application No. 201917020469.
Jun. 20, 2017 International Search Report issued in International Patent Application No. PCT/JP2017/012924.
Jan. 16, 2018 International Search Report issued in International Patent Application No. PCT/JP2017/040208.
U.S. Appl. No. 16/342,505, filed Apr. 16, 2019 in the name of Hayato Ooi et al.
Jun. 12, 2020 Office Action Issued in U.S. Appl. No. 16/842,828.
Jun. 16, 2020 Office Action issued in Indian Patent Application No. 201917020468.
Jun. 9, 2020 Office Action issued in Japanese Patent Application No. 2019-106278.
U.S. Appl. No. 16/842,828, filed Apr. 8, 2020 in the name of Hayato Ooi et al.
Nov. 17, 2020 Office Action issued in German Patent Application No. 11 2017 005 623.3.

(56) References Cited

OTHER PUBLICATIONS

Nov. 19, 2020 Office Action issued in German Patent Application No. 11 2017 005 624.1.

* cited by examiner

ELECTRIC WIRE CONDUCTOR, COVERED ELECTRIC WIRE, AND WIRING HARNESS

TECHNICAL FIELD

The present invention relates to an electric wire conductor, a covered electric wire, and a wiring harness, and more specifically, to an electric wire conductor made of a wire strand, a covered electric wire containing an insulator on an outer periphery of the electric wire conductor, and a wiring harness including the covered electric wire.

BACKGROUND ART

A flat cable containing a flat-shaped conductor is commonly known. A flat cable occupies a smaller space for routing than a conventional electric wire configured with a conductor having a substantially circular cross-section.

As described in Patent Literature 1, a flat rectangular conductor is often used as a conductor for conventional flat cable. The rectangular flat conductor is made of a single metal wire formed to have a rectangular cross-section.

CITATION LIST

Patent Literature

Patent Literature 1: JP 2014-130739 A

SUMMARY OF INVENTION

Problems to be Solved by the Invention

A flat rectangular conductor has comparatively high flexibility, and easily bends in a height (thickness) direction of the flat cross-section. However, in a width direction of the flat cross-section, the conductor has low flexibility, and is too rigid to bend easily. Thus, the flat cable having the rectangular conductor hardly bends in the particular direction, which lowers workability of the cable upon routed.

The present invention has been made to solve the above problems, and an object of the present invention is to provide an electric wire conductor having both flexibility and a space-saving property, a covered electric wire, and a wiring harness including such an electric wire conductor.

Means of Solving the Problems

To achieve the objects and in accordance with the purpose of the present invention, an electric wire conductor according to the present invention contains a wire strand containing a plurality of elemental wires twisted together, the electric wire conductor having a flat portion where a cross-section of the wire strand intersecting an axial direction of the wire strand has a flat shape.

The cross-section preferably includes opposing edges being parallel to each other along the width direction of the flat shape. The cross-section preferably has a quadrangular shape. Further, the cross-section preferably has a rectangular shape. The wire strand is preferably pressed from a first direction and a second direction opposing to each other, and from a third direction and fourth direction opposing to each other and intersecting the first direction and the second direction.

A covered electric wire according to the present invention contains the electric wire conductor as described above and an insulator covering the electric wire conductor.

A wiring harness according to the present invention contains the covered electric wire as described above.

The wiring harness preferably contains a plurality of the covered electric wires as described above, the plurality of the covered electric wires preferably being aligned along at least one of a width direction of the electric wire conductor and a height direction intersecting the width direction. The wiring harness is preferably disposed under a floor of an automobile to constitute a power-supply trunk line. Alternatively, the wiring harness preferably constitutes a ceiling or a floor of an automobile. The wiring harness preferably contains a first covered electric wire and a second covered electric wire, wherein the first covered electric wire contains the covered electric wire, as described above, containing the electric wire conductor made of aluminum or an aluminum alloy, and the second covered electric wire contains an electric wire conductor made of copper or a copper alloy having a lower flatness and a smaller conductor cross-sectional area than the electric wire conductor of the first covered electric wire. In this case, the conductor cross-sectional area of the second covered electric wire is preferably 0.13 mm$^2$ or smaller.

Advantageous Effects of Invention

The electric wire conductor according to the present invention has high flexibility because it is formed of a wire strand but not of a single wire. Further, the flat portion having the flat cross-section contributes to reduce a space required for routing as an electric wire compared with a conventional electric wire conductor having a substantially circular cross-section. Furthermore, in a case where the conductor cross-sectional area is made large, a length in the height direction can be kept small by increasing a length in the width direction of the flat shape, whereby the conductor cross-sectional area can be increased while maintaining the space-saving property.

When the cross-section of the flat portion includes opposing edges being parallel to each other along the width direction of the flat shape, a large space can be effectively provided on the outside in the height (i.e., thickness) direction of the electric wire to be routed, which leads to high space-saving property of the electric wire. In particular, when a plurality of electric wires are stacked when routed, an unnecessary large space is not required.

Further, when the cross-section of the flat portion is a quadrangular shape, useless spaces between electric wires are reduced when a plurality of the electric wires are aligned or stacked, whereby the electric wires can be assembled densely.

Furthermore, when the cross-section of the flat portion is a rectangular shape, useless spaces between the electric wires are especially reduced when aligning or stacking a plurality of the electric wires, achieving the remarkably excellent space-saving property.

In addition, when the wire strand is pressed from the first direction and the second direction opposing to each other, and from the third direction and the fourth direction opposing to each other and intersecting the first direction and the second direction, the electric wire conductor can be effectively formed to have a substantially quadrangle cross-section, thus achieving the excellent space-saving property.

Since the covered electric wire according to the present invention contains the electric wire conductor as described above, the covered electric wire has both flexibility resulting from the electric wire conductor being a wire strand and space-saving property resulting from the electric wire conductor having a flat shape. Therefore, in the case where the plurality of the covered electric wires are aligned or stacked when routed, the routing can be carried out with high degree of freedom while saving the space.

As the wiring harness according to the present invention contains the covered electric wire containing the flat electric wire conductor as described above, it has excellent flexibility and space-saving property, and thus can be suitably used as a wiring material in a limited space such as an automobile.

Here, when the wiring harness contains a plurality of the covered electric wires as described above, and the plurality of the covered electric wire are aligned along at least one of the width direction of the electric wire conductor and the height direction intersecting the width direction, the wiring harness can be formed while reducing the spaces between the plurality of the covered electric wires, thus having the remarkably high space-saving property.

Further, when the wiring harness is disposed under the floor of an automobile to constitute the power-supply trunk line, compared with a conventional power-supply trunk line using a copper plate, the productivity can be enhanced and the fatigue fracture due to the engine vibration, for example, can be suppressed.

When the wiring harness constitutes the ceiling or the floor of an automobile, the space in the automobile can be further effectively used to provide a wiring route, and the high heat dissipation performance can be achieved also in the case of applying a large electric current. Further, a ceiling surface or a floor surface of any shape can be formed in accordance with the arrangement of the covered electric wires.

Further, when the wiring harness contains the first covered electric wire and the second covered electric wire, in which the first covered electric wire is the above described covered electric wire having the electric wire conductor made of aluminum or an aluminum alloy, and the second covered electric wire has the electric wire conductor made of copper or a copper alloy having a lower flatness and a smaller conductor cross-sectional area than the electric wire conductor of the first covered electric wire, the space occupied by the first covered electric wire, which tends to have a large area because of the low electrical conductivity of aluminum and the aluminum alloy, can be reduced, and simultaneously, characteristics of the second covered electric wire brought about by the copper or copper alloy such as the high electrical conductivity in the second covered electric wire can be used.

In this case, when the conductor cross-sectional area of the second covered electric wire is 0.13 mm$^2$ or smaller, the entire wiring harness can effectively have a high space-saving property.

BRIEF DESCRIPTION OF DRAWINGS

In FIGS. 4B to 4D, elemental wires are omitted.

DESCRIPTION OF EMBODIMENTS

Hereinafter, detailed descriptions of an electric wire conductor, a covered electric wire, and a wiring harness according to one embodiment of the present invention will be provided with reference to FIGS. 1 to 9. A covered electric wire according to one embodiment of the present invention contains an electric wire conductor according to one embodiment of the present invention and an insulator covering the conductor. In addition, a wiring harness according to one embodiment of the present invention contains a plurality of covered electric wires assembled together containing the covered electric wire according to one embodiment of the present invention.

[Electric Wire Conductor]

Figure 1:
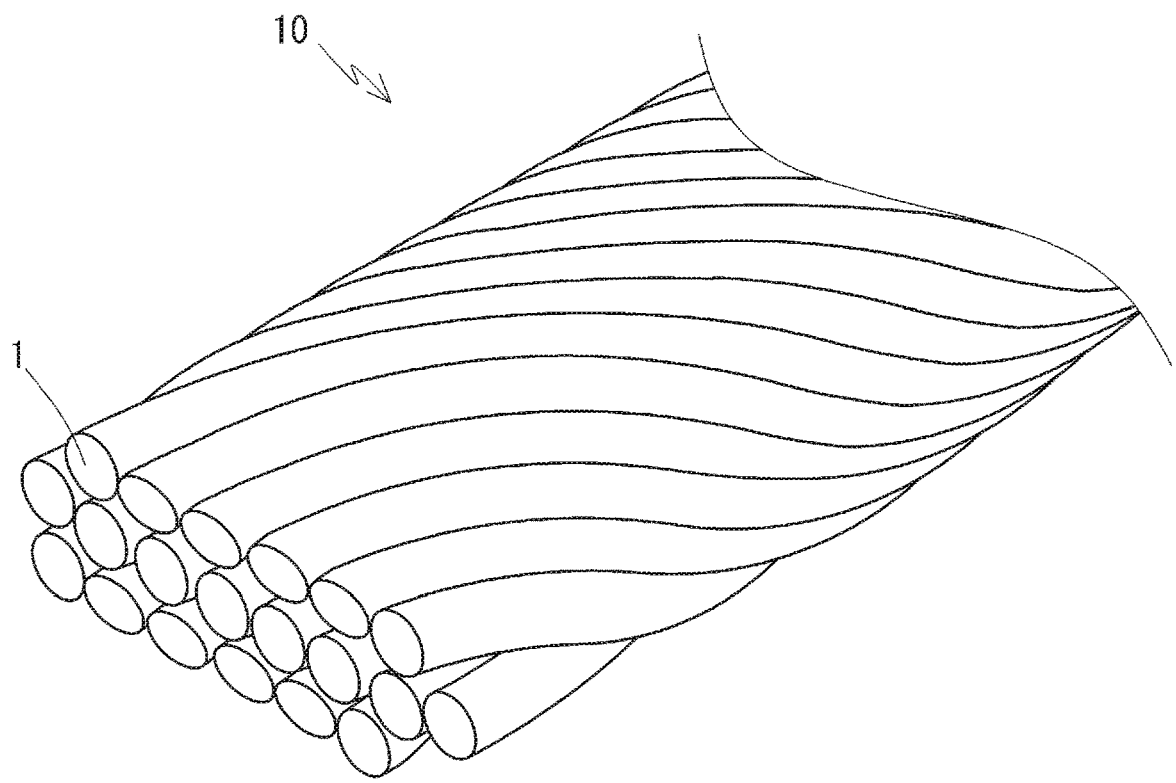
FIG. 1 is a perspective view of an electric wire conductor according to one embodiment of the present invention.
Figure 2:
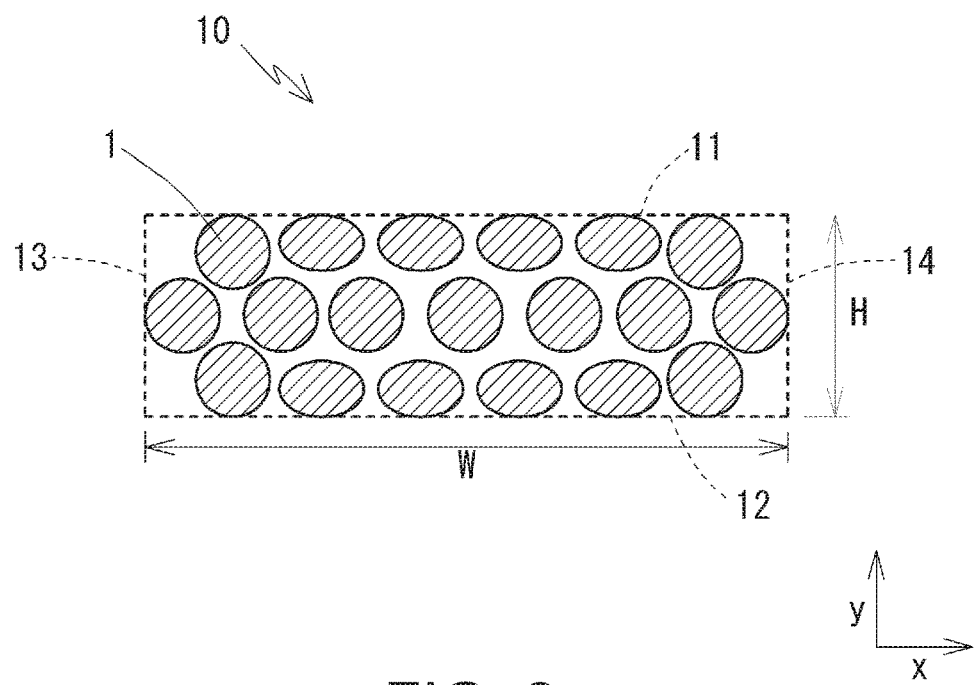
FIG. 2 is a cross-sectional view of the electric wire conductor.

FIG. 1 is a perspective view of an external appearance of an electric wire conductor 10 according to one embodiment of the present invention. FIG. 2 shows a cross-section perpendicularly intersecting an axial direction (longitudinal direction) of the electric wire conductor 10.

The electric wire conductor 10 is configured as a wire strand containing a plurality of elemental wires 1 twisted together. Further, the electric wire conductor 10 has a flat outer shape. In other words, the electric wire conductor 10 has a flat shape in which a cross-section perpendicularly intersecting the axial direction of the electric wire conductor 10 is flat.

Here, the concept that "the cross-section of the electric wire conductor 10 is flat" describes a state where a width W, which is a length of the longest line among lines that pass through the cross-section in parallel to edges constituting the cross-section and encompass the entire cross-section, is larger than a height H, which is a length of a line perpendicular to the above-mentioned longest line and encompass the entire cross-section. In the cross-section of the electric wire conductor 10 according to the present embodiment shown in FIG. 2, and in each of the cross-sections of the electric wire conductors in the embodiments shown in FIGS. 4A to 4D, the width W is larger than the height H.

While the cross-section of the electric wire conductor 10 may have any specific shape as long as it is flat, the cross-section of the electric wire conductor 10 in the present embodiment has opposing edges 11 and 12 that are parallel to each other along a direction of width W (width direction x) of the flat shape. In other words, two parallel lines 11 and 12 can be drawn in the width direction x, so as to circumscribe the outer elemental wires 1 forming the cross-section of the electric wire conductor 10. In the present description, concerning the shape of the electric wire conductor 10, concepts for describing relationships among lines and surfaces such as parallel and vertical may include a deviation with reference to the concepts in geometry such as a deviation at an angle of approximately plus or minus 15 degrees, or an R shape where each corner is rounded.

In the present embodiment, the cross-section of the electric wire conductor 10 has a rectangular shape. In other words, two straight lines 11 and 12 can be drawn in a direction of height (i.e., height direction y) intersecting the two parallel circumscribing lines extending in the width direction x so as to circumscribe the outer elemental wires 1 forming the cross-section of the electric wire conductor 10. Due to the flat shape of the cross-section, the lines 13 and 14 are shorter than the lines 11 and 12.

Figure 4A:
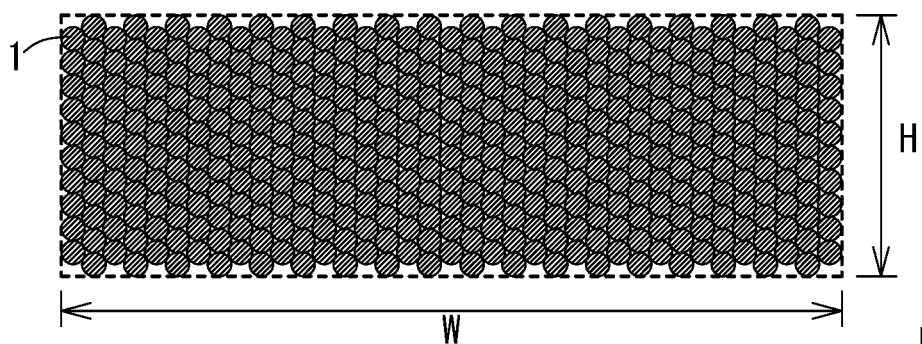
FIGS. 4A to 4D are views showing a variety of cross-sectional shapes of the electric wire conductor, and FIGS. 4A to 4D respectively show different shapes.
Figure 4B:

In the present embodiment, the number of the elemental wires 1 contained in the electric wire conductor 10 is reduced for easier understanding. Thus, in the cross-section shown in FIG. 2, the straight lines 13 and 14 extending in the height direction y respectively contact only one elemental wire 1. The electric wire conductor 10 may have a substantially rectangular cross-section or an ellipse cross-section as shown in FIG. 4B. As shown in FIG. 4A, when the number of the elemental wires 1 is large, the straight lines 13 and 14 extending in the height direction y can be drawn so as to respectively contact multiple elemental wires 1. Thus, the rectangular cross-section may be distinguished from the ellipse cross-section.

As the electric wire conductor 10 according to the present embodiment has a flat cross-section, when it is routed in a form of the covered electric wire, for example, a space necessary for routing may be made smaller than a case of routing an electric wire having a substantially circular cross-section of the same conductor cross-sectional area as the electric wire conductor. In other words, spaces around an electric wire in which other electric wires or other members are not allowed to be disposed can be reduced. In particular, a space occupied by the electric wire in a height direction y can be made smaller. Thus, the electric wire effectively achieves a space-saving property. Consequently, other electric wires or other members can be sufficiently disposed in a space vertically provided in the height direction (±y direction) outside of the electric wire. For example, in the case of routing the electric wire along a surface for routing, when a flat surface of the electric wire, that is, a surface parallel to the width direction x is arranged along the surface for routing, it is possible to effectively provide a space above the electric wire (in a direction opposing to the surface for routing, having the electric wire therebetween). Further, in a case where a conductor cross-sectional area of the electric wire conductor 10 is desired to be large, the space-saving property in the height direction y can be maintained by making the width W large while keeping the height H small.

In particular, the electric wire conductor 10 having opposing edges 11 and 12 parallel to the width direction x in its cross-section can provide a large space vertically in the height direction (±y direction) outside the routed electric wire, whereby an excellent space-saving property is achieved. Especially, in the case of assembling a plurality of electric wires by stacking one electric wire on another electric wire, spaces between the plurality of electric wires along the height direction y can be reduced. Here, the concept of "assembling a plurality of electric wires" includes both of a configuration where a plurality of electric wires are integrally bundled with an insulation material, for example, and a configuration where a plurality of independent electric wires are closely disposed.

Furthermore, the electric wire conductor 10 having a rectangular cross-section can provide a large space vertically (±y direction) and laterally (±x direction), whereby the space-saving property is further improved. Especially, in the case of assembling the plurality of electric wires with stacking one electric wire on another electric wire, or with aligning one electric wire laterally to another electric wire, spaces between the plurality of electric wires along the height direction y and the width direction x can be reduced.

As described above, the electric wire conductor 10 according to the present embodiment contains the wire strand containing a plurality of elemental wires 1 twisted together, and the wire strand has a flat outer shape. Therefore, the electric wire conductor 10 has excellent flexibility in each direction. Patent Literature 1 discloses a rectangular conductor that has flexibility in the height direction to a certain degree, but shows low flexibility in the width direction and is too rigid to bend easily in the width direction. In contrast, the electric wire conductor 10 according to the present embodiment including the wire strand has the excellent flexibility and easily bends in the width direction x as well as the height direction y.

Thus, the electric wire conductor 10 according to the present embodiment can achieve both the flexibility, which provides freedom in routing, and the space-saving property. In an automobile, for example, due to recent high functionalization, the number of electric wires and components to be disposed is increasing. Also, a larger electric current is demanded for vehicles such as electric vehicles, which results in enlargement of a diameter of the electric wire, whereby a space for routing individual electric wires has been reduced. However, the electric wire conductor 10 according to the present embodiment can effectively use a small space when routed because of the space-saving property and the excellent flexibility. In the case of assembling a great number of electric wires, or using an electric wire having a large conductor cross-sectional area, this advantage is especially enhanced.

Figure 4C:
Figure 4D:

In the above-described embodiment, the electric wire conductor 10 has a rectangular cross-section. However, as described above, the cross-section of the electric wire conductor 10 may be of any shape as long as it is flat. FIGS. 4B to 4D show other examples of the cross-sectional shape. Here, in FIGS. 4B to 4D, the elemental wires 1 are omitted to show only the outer shape of the cross-section, that is, a circumscribed edges which approximate cross-sections of the electric wire conductors. FIG. 4B shows a cross-section in an ellipse shape (a shape of a rectangle with half circles attached to both ends). As a cross-section in a quadrangle shape other than the above-mentioned rectangular shape, FIG. 4C shows a cross-section in a trapezoidal shape, and FIG. 4D shows a cross-section in a parallelogram shape. Since the electric wire conductor 10 has a quadrangle cross-section, a great number of electric wire conductors 10 may be disposed in the height direction y and the width direction x with small spaces, which contributes to the excellent space-saving property for assembling a great number of electric wires. This advantage is especially remarkable when the cross-sectional shape is a rectangle as described above.

Figure 9:
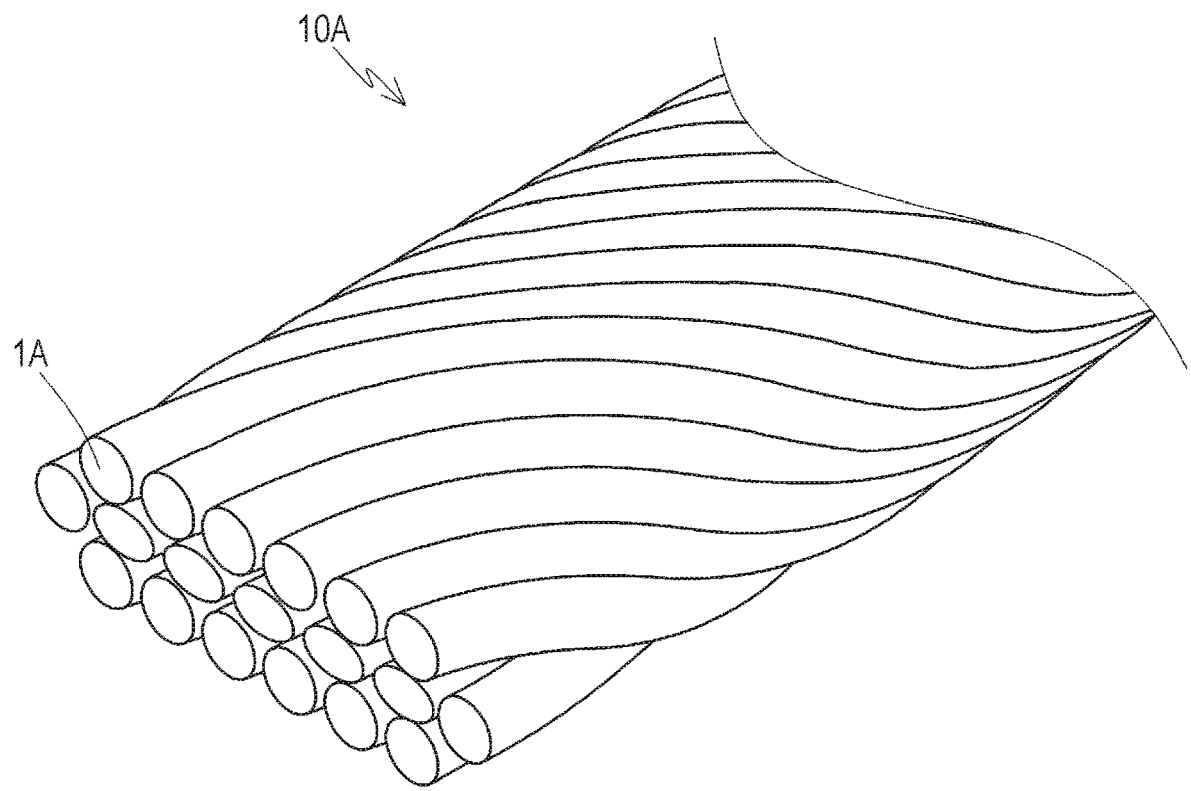
FIG. 9 is a perspective view of an electric wire conductor according to another embodiment.
Figure 10:
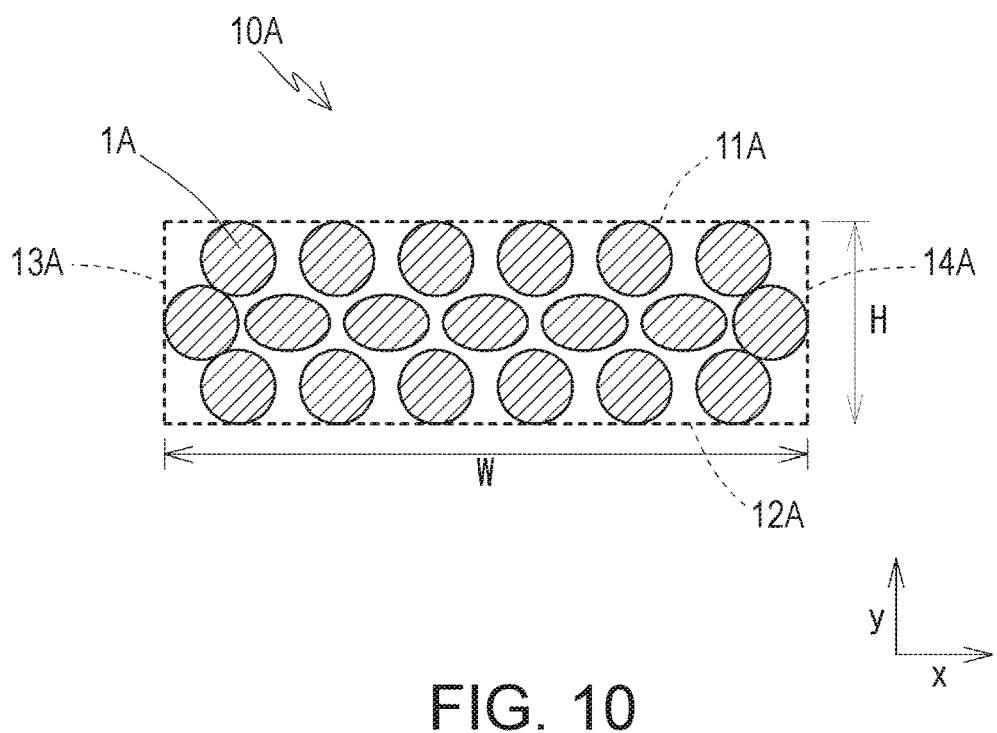
FIG. 10 is a cross-sectional view of the electric wire conductor shown in FIG. 9.

For the electric wire conductor 10 according to the present embodiment, the cross-sectional shape of each elemental wire 1 constituting the electric wire conductor 10 may be of any shape as long as the outer shape of the entire electric wire conductor 10 is flat. A conventional electric wire having a substantially circular cross-section may be employed as the elemental wire 1 in the present embodiment. However, at least a part of the plurality of elemental wires 1 may have cross-sections of shapes deviated from a circle, such as flat shapes. An exemplary embodiment illustrating this configuration is shown in FIGS. 9 and 10. FIGS. 9 and 10 correspond to FIGS. 1 and 2, and illustrate a wire conductor 10A, elemental wires 1A, and lines 11A, 12A, 13A, and 14A, as in FIGS. 1 and 2, but only the elemental wires 1A in the middle section have flat shapes deviated from a circle. As will be described later, when a raw wire strand 10' is pressed into a flat shape, at least a part of the elemental wires 1 may be deformed into flat shapes, depending on, for example, the material constituting the elemental wires 1. Such deformation tends to occur for the elemental wires 1 disposed at outer parts of the raw wire strand 10'. An exemplary embodiment illustrating this configuration is shown in FIGS. 1 and 2 where outer elemental wires 1 are deformed. Especially, the elemental wires 1 disposed at the corner portions in the rectangular cross-section after pressing may be deformed to have complex shapes. Note that FIG. 4A illustrates the elemental wires without deformation.

The elemental wires 1 constituting the electric wire conductor 10 may be made of any conductive material such as a metal material. Examples of typical material constituting the elemental wire 1 may contain copper, a copper alloy, aluminum, and an aluminum alloy. These metal materials are suitable for the electric wire conductor 10 according to the present embodiment in that processes of forming the wire strand and pressing into a flat shape are easy to be carried out, and the flat shape is easy to be maintained. As the elemental wires 1 constituting the electric wire conductor 10, the elemental wires all made of the same material may be used, or a multiple kinds of elemental wires made of different materials may be mixed.

The conductor cross-sectional area of the electric wire conductor 10 may be appropriately selected according to a desired electrical conductivity, for example. However, the larger the conductor cross-sectional area is, the easier it becomes to form the flat shape by processes such as pressing, and the flat shape once formed can be firmly maintained. A preferable conductor cross-sectional area is, for example, 16 $mm^2$ to 40 $mm^2$ or more when the elemental wires 1 constituting the electric wire conductor 10 are made of copper or a copper alloy, and 40 $mm^2$ to 40 $mm^2$ or more when the elemental wires 1 are made of aluminum or an aluminum alloy. A preferable outer diameter of each elemental wire 1 contained in the electric wire conductor 10 is, for example, 0.3 to 1.0 mm.

For the cross-section of the electric wire conductor 10, an aspect ratio (H:W) of the flat shape may be appropriately selected in consideration of a desired space-saving property, for example. The range of 1:2 to 1:8 may be provided as an example of the aspect ratio. Within this range, the wire strand can be effectively formed into the flat shape while obtaining the high space-saving property. Further, in a case where the electric wire conductor 10 is used for wiring in an automobile, for example, a configuration in which a height H is 3 mm or smaller may be provided as a preferable example.

Figure 3:
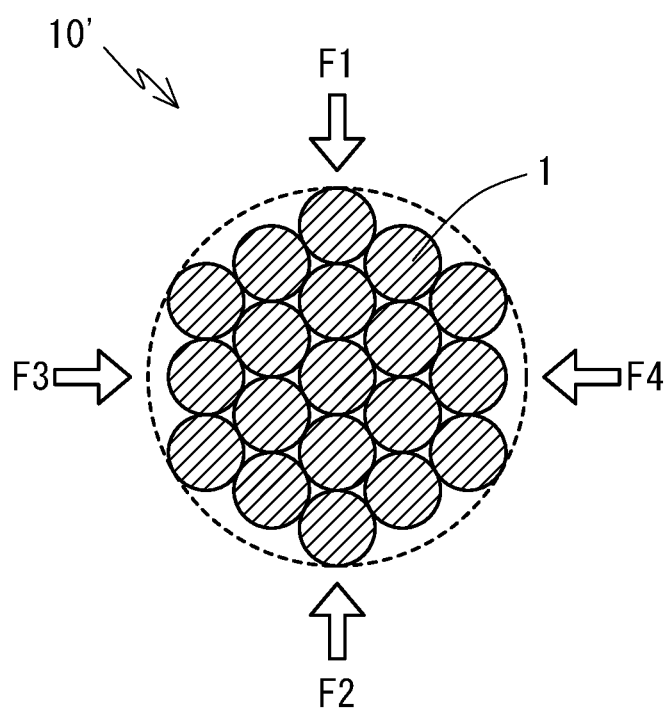
FIG. 3 is a cross-sectional view which illustrates rolling of a raw wire strand.

As shown in FIG. 3, the electric wire conductor 10 according to the present embodiment can be formed by pressing a raw wire strand 10' which contains a plurality of elemental wires 1 twisted together and has a substantially circular cross-section. For pressing, forces F1 and F2 are applied from a first direction and a second direction opposing one another that are perpendicular to the axial direction of the raw wire strand 10' to compress the raw wire strand 10', so as to obtain a flat electric wire conductor 10 in which an applying direction of the forces F1 and F2 corresponds to the height direction y.

Figure 8:
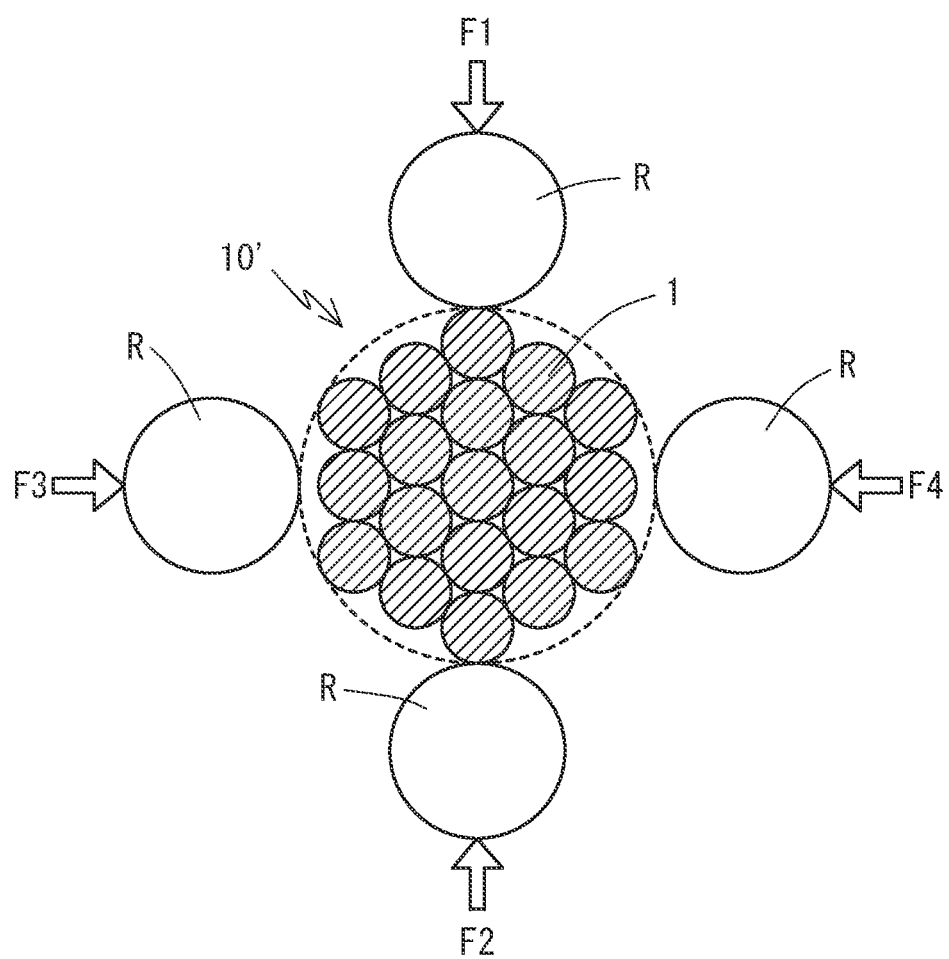
FIG. 8 is a view of a step of compressing a raw wire strand comprising a plurality of elemental wires twisted together by passing the raw wire strand between a plurality of rollers R opposed to each other.

Further, as shown in FIG. 8, in addition to the forces F1 and F2 applied from the first direction and the second direction, forces F3 and F4 are applied to the raw wire strand 10' from a third direction and a forth direction opposing one another and intersecting the first and second directions, so as to effectively form electric wire conductor 10 to have a quadrangular cross-section. Especially, by applying the forces F3 and F4 from directions perpendicular to the forces F1 and F2, the electric wire conductor 10 is effectively formed to have a rectangular cross-section. In this case, by making the forces F1 and F2 larger than the forces F3 and F4, the electric wire conductor 10 with a high flatness (i.e., the ratio of W to H is large) can be obtained. Further, the forces F1 and F2, and the forces F3 and F4 may be applied simultaneously; however, by applying the forces F1 and F2 first, and then applying the forces F1' and F2' from the same directions as the forces F1 and F2 simultaneously with the forces F3 and F4, the electric wire conductor 10 with the high flatness can be obtained, in which the cross-section is firmly formed into a quadrangular shape (especially, a rectangular shape). In the case of changing the flatness along the axial direction of the electric wire conductor 10, the applied forces may be changed during the pressing along the axial direction. The forces may be applied to the raw wire strand 10', for example, by passing the raw wire strand 10' between the rollers R disposed opposing to each other, as illustrated in FIG. 8.

[Covered Electric Wire]

As described above, a covered electric wire 20 according to one embodiment of the present invention contains the electric wire conductor 10 according to the embodiment of the present invention as described above, and the insulator 21 which covers the outer periphery of the electric wire conductor 10.

An outer shape of the entire covered electric wire including the insulator reflects the outer shape of the electric wire conductor 10. As the electric wire conductor 10 has a flat shape, the covered electric wire also has a flat shape. Further, as the electric wire conductor 10 has high flexibility in each direction, the covered electric wire also has high flexibility in each direction.

A material of the insulator is not specifically limited, and a variety of polymer materials may be used to form the insulator. Further, the polymer material may contain fillers or additives as appropriate. However, it is preferable to select the material for the insulator and a thickness thereof such that the flexibility of the insulator is higher than the flexibility of the electric wire conductor 10, so as not to deteriorate the excellent flexibility of the electric wire conductor 10. In addition, it is preferable to select the thickness of the insulator such that the flat shape of the electric wire conductor 10 is sufficiently reflected to the shape of the entire covered electric wire 20 so that the entire covered electric wire 20 has a flat cross-section.

The insulator may cover a whole periphery of the electric wire conductor 10. In this case, the insulator can be provided by extruding the polymer material for the insulator on the whole periphery of the electric wire conductor 10. Alternatively, sheet-shaped insulators may sandwich the electric wire conductor 10 from the top and the bottom in the height direction (±y direction) of the electric wire conductor 10. In this case, the polymer material formed into two sheets are disposed at the top and bottom of the electric wire conductor 10 and may be adjoined each other by fusing or adhesion, for example, as appropriate.

The covered electric wire may be used in a form of a single wire in which the outer periphery of one electric wire conductor 10 is covered with the insulator, or may be used in a form of a wiring harness in which a plurality of covered electric wires are integrally bundled with a covering material, for example, as necessary. Hereinafter, examples of the wiring harness containing the covered electric wires will be described.

[Wiring Harness]

Figure 7:
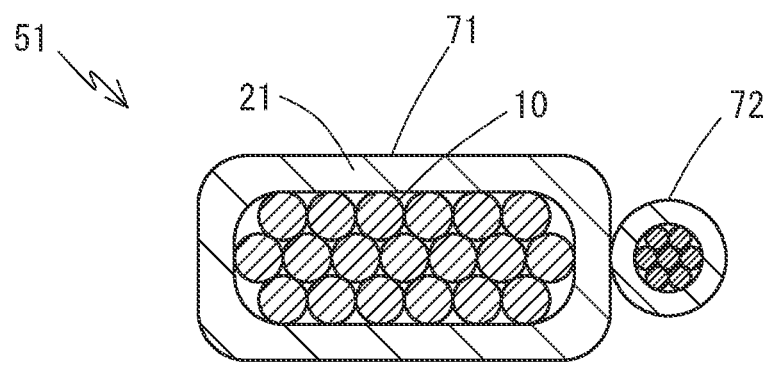
FIG. 7 is a view of a first covered electric wire and a second covered electric wire, the second covered wire having a lower flatness and a smaller conductor cross-sectional area than the electric wire conductor of the first covered electric wire.

A wiring harness 51 according to one embodiment of the present invention contains a plurality of covered electric wires being bundled, in which at least a part of the plurality of covered electric wires are the covered electric wires according to the embodiment of the present invention containing the above-mentioned flat electric wire conductors 10. The wiring harness 51 may contain only the covered electric wires containing the above-mentioned flat electric wire conductors 10. Alternatively, the wiring harness 51 may contain such covered electric wires together with different kinds of covered electric wires such as a covered electric wire containing a conventional electric wire conductor having a substantially circular cross-section, as shown in FIG. 7 for example. For example, FIG. 7 illustrates an electric wire conductor 71 having a flat shape in cross-section, and a conventional electric wire conductor 72 having a substantially circular cross-section. Further, in a case where the wiring harness 51 contains a plurality of covered electric wires containing the flat electric wire conductors 10, features such as a material, shape, and size of the electric wire conductor 10 and the insulator constituting the plurality of the covered electric wires may be of the same or may be different from each other.

Figure 5:
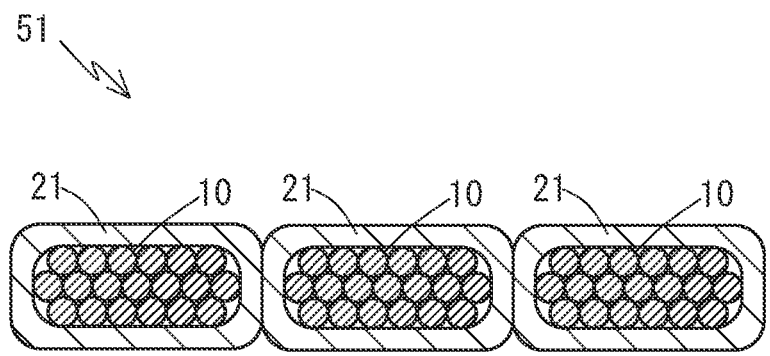
FIG. 5 is a view of a plurality of covered wires each comprising the electric wire conductor, being aligned in the width direction.
Figure 6:
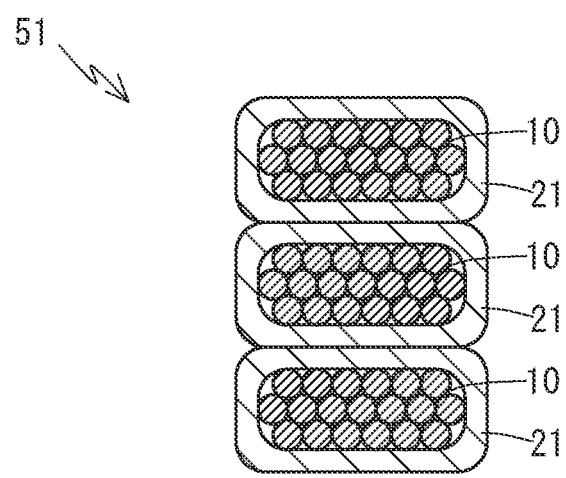
FIG. 6 is a view of a plurality of covered wires each comprising the electric wire conductor, being aligned in the height direction.

In the case of constructing a wiring harness 51 with the plurality of covered electric wires containing the flat electric wire conductors 10, the plurality of covered electric wires may be disposed in any positional relationship. For example, as shown in FIG. 5, the covered electric wires may be aligned side by side in the width direction x (the lateral direction) of the flat electric wire conductor 10, or may be stacked in the height direction y as shown in FIG. 6, or may be in a matrix shape in which the plurality of covered electric wires disposed side by side in the width direction x are stacked in multiple layers in the height direction y. That is to say, the plurality of covered electric wires may be aligned along at least either the width direction x or the height direction y. In this way, the neat arrangement of the plurality of covered electric wire containing the flat electric wire conductors 10 makes it possible to reduce spaces between the covered electric wires forming the wiring harness 51, thus providing the wiring harness 51 with a remarkably excellent space-saving property.

In particular, it is preferable that the plurality of covered electric wires 20 are disposed side by side in the width direction x of the flat electric wire conductor 10. Due to this, the space-saving property along the height direction y resulting from the flat shape of the electric wire conductors 10 may be effectively used in formation and routing of the wiring harness 51.

Thus, when the wiring harness 51 including the covered electric wires having the flat electric wire conductor 10 is used, for example, as a wiring material for an automobile, it is possible to effectively utilize the excellent space-saving property. Routing such a wiring harness 51 along a member such as floor and a frame of a vehicle makes it possible to effectively utilize a limited space under the floor or around the frame for routing. Meanwhile, when the wiring harness 51 is disposed such that the width direction x of the electric wire conductor 10 is approximately parallel to the surface of a floor or a frame member, more excellent space-saving property can be achieved.

A conventional wiring harness contains covered electric wires having a substantially circular cross-section bundled together, thus the entire wiring harness tends to be bulky. In order to produce a space for routing in an automobile, a residential space (a space where a passenger can stay) is often reduced. However, as described above, when the wiring harness 51 containing the flat electric wire conductor 10 is used to keep the space necessary for routing the wiring harness 51 small, a large residential space can be provided.

The wiring harness 51 according to the present embodiment may be used in an automobile as a wiring material for any purpose; and for example, it may be used as a power-supply trunk line to be disposed under a floor. A conventional power-supply trunk line for an automobile has been made of a material which contains an insulation sheet and copper plates disposed side by side; however, continuously forming a large copper plate is difficult and results in a low productivity. In addition, since the material contains a continuous metal body, fatigue fracture of the material possibly occurs due to influence of engine vibration of the automobile, for example. In contrast, when the wiring harness 51 according to the present embodiment constitutes a power-supply trunk wire, each of the process of forming the elemental wire 1 constituting the electric wire conductor 10, twisting the elemental wires 1, and forming the raw wire strand 10' obtained through twisting of the elemental wires 1 into a flat shape can be continuously performed for every portion of a continuous material, thus achieving a high productivity. Further, as the electric wire conductor 10 contains thin elemental wires 1, the entire electric wire conductor 10 has a high durability against bending and vibration. Therefore, the fatigue fracture due to the engine vibration, for example, hardly occurs.

The wiring harness 51 may not only be routed under the floor of the automobile, but also form a floor or a ceiling itself with the wiring harness 51 according to the present embodiment, for example. In an automobile, the wiring harness 51 needs to be routed so as not to interfere with components such as an engine; however, such a wiring route is limited. In particular, in an automobile requiring a large current such as a hybrid vehicle and an electric vehicle, an electric wire with a large conductor cross-sectional area is required to be routed, but a wiring route capable of arranging the wiring harness 51 including such an electric wire with a large conductor cross-sectional area is limited. However, by constituting the floor or the ceiling with the wiring harness 51 according to the present embodiment, the space can effectively provide the wiring route, and also a large residential space can be ensured, which leads to both the space-saving property and the requirement for application of a large electric current. Further, in a covered electric wire for a large electric current, an insulator easily deteriorates due to a heat generated by an electric wire conductor; however, arranging the wiring harness 51 as the floor and the ceiling can effectively enhance heat dissipation performance. As a result, although an insulator of low price with a comparatively low heat dissipation performance is used to configure the covered electric wire, deterioration of the insulator hardly occurs. Furthermore, as the covered electric wire containing the flat electric wire conductor 10 has the flat surface, the covered electric wires may be disposed in various arrangements within a wiring harness 51, so that a combination of the flat surfaces enables the floor and the ceiling to have any surface shapes. When the wiring harness 51 according to the present embodiment constitutes the floor or the ceiling, a covering material may be appropriately arranged on the outer side of the wiring harness 51 so as not to directly expose the wiring harness 51 to a ceiling surface and a floor surface.

As described above, the wiring harness 51 according to an embodiment of the present invention may contain the covered electric wires containing the flat electric wire conductor 10 according to an embodiment of the present invention in combination with other kinds of covered electric wires. The covered electric wires according to an embodiment of the present invention and other kinds of covered electric wires may have combination of specific features such as constituent material, shape, and size. Among them, examples may include a configuration using the covered electric wire conductor according to an embodiment of the present invention (i.e., a first covered electric wire) containing the flat electric wire conductor 10 made of aluminum or an aluminum alloy (i.e., aluminum material), and other kinds of covered electric wire (i.e., a second covered electric wire) containing an electric wire conductor made of copper or a copper alloy (i.e., copper material) having a substantially circular cross-section, for example, with the flatness lower than the electric wire conductor 10 of the first covered electric wire. In this case, it is preferable that a conductor cross-sectional area of the second covered electric wire is smaller than a conductor cross-sectional area of the first covered electric wire.

The aluminum material has come to be used as an electric wire conductive material for automobiles instead of the copper material for the purpose of reducing automobile weight; however, as described above, in the case where the aluminum material is used, the conductor cross-sectional area of the electric wire conductor tends to be larger than in the case where the copper material is used, because the aluminum material has a lower electrical conductivity as a material. Thus, if the electric wire conductor made of an aluminum material is used as a conventional conductor having a circular cross-section and contained in the wiring harness, a diameter of the electric wire conductor becomes large, which requires a large space for routing the wiring harness; however, the flat electric wire conductor 10 can reduce the space required for routing while ensuring the large conductor cross-sectional area. On the other hand, even the electric wire conductor made of the copper material is used, it does not significantly interfere the weight reduction of automobiles as long as it is a small diameter wire with a small conductor cross-sectional area. Also, it hardly enlarges space required for routing the wiring harness. Accordingly, using the first covered electric wire including the flat electric wire conductor 10 made of the aluminum material in combination with the second covered electric wire including the electric wire conductor having a substantially circular cross-section made of the copper material with a smaller conductor cross-sectional area, excellent properties of the copper material such as a high electrical conductivity may be utilized as a property of a part of the wiring harness while ensuring the space-saving property. Suitable examples of the electric wire conductor constituting the second covered electric wire may include a copper alloy thin wire with a conductor cross-sectional area of 0.13 mm$^2$ or smaller. Such a copper alloy thin wire may be suitably used as a signal wire. Forming the second covered electric wire into thin as described above makes it possible to effectively utilize the space-saving property brought about by the flat electric wire conductor 10 contained in the first covered electric wire.

Although embodiments of the present invention have been descried above in detail, the present invention is not limited to the particular embodiment(s) disclosed herein, and various changes and modifications may be made without deviating from the scope of the present invention.

LIST OF REFERENCE NUMERALS

1 Elemental wire
10 Electric wire conductor
10' Raw wire strand
21 Insulator
51 Wiring Harness
R Rollers
H Height
W Width
x Width direction
y Height direction

The invention claimed is:
1. A wiring harness comprising:
a first covered electric wire comprising:
an electric wire conductor comprising a wire strand comprising a plurality of elemental wires twisted together, the electric wire conductor being made of aluminum or an aluminum alloy; and
an insulator covering the electric wire conductor, wherein:
the wire strand is compressed from a first direction and a second direction opposing to each other, and from a third direction and a fourth direction opposing to each other and intersecting the first direction and the second direction,
the electric wire conductor has a flat portion where a cross-section of the wire strand intersecting an axial direction of the wire strand has a flat shape, and
the elemental wires comprise first elemental wires which have non-circular shapes in the cross-section of the wire strand intersecting the axial direction of the wire strand, and second elemental wires which have a circular shape in the cross-section; and
a second covered electric wire, the second covered electric wire comprising a second electric wire conductor made of copper or a copper alloy having a lower flatness and a smaller conductor cross-sectional area than the electric wire conductor of the first covered electric wire.
2. The wiring harness according to claim 1, wherein the cross-section includes opposing edges being parallel to each other along a width direction of the flat shape.
3. The wiring harness according to claim 1, wherein the cross-section has a quadrangular shape.
4. The wiring harness according to claim 1, wherein the cross-section has a rectangular shape.
5. The wiring harness according to claim 1, wherein the wire strand is made of aluminum or an aluminum alloy and has a conductor cross-sectional area of 40 to 100 mm$^2$, and the elemental wires each have an outer diameter in a range of 0.3 to 1.0 mm.
6. The wiring harness according to claim 1, the wiring harness comprising a plurality of the first covered electric wires,
wherein the plurality of the first covered electric wires are aligned along at least one of a width direction of the electric wire conductor and a height direction intersecting the width direction.

7. The wiring harness according to claim 6, wherein the plurality of the first covered electric wires are aligned at least along the height direction.

8. The wiring harness according to claim 1, wherein the wiring harness is disposed under a floor of an automobile to constitute a power-supply trunk line.

9. The wiring harness according to claim 1, wherein the wiring harness is disposed within a ceiling or a floor of an automobile.

10. The wiring harness according to claim 1, wherein the conductor cross-sectional area of the second covered electric wire is 0.13 mm$^2$ or smaller.

11. A method for producing the wiring harness according to claim 1, the method comprising:

compressing the wire strand comprising the plurality of elemental wires twisted together by passing the wire strand between rollers opposing each other to form the electric wire conductor; and assembling the electric wire conductor and the insulator to form the first covered electric wire; and forming the second covered electric wire.

12. The method according to claim 11, wherein in the step of pressing the wire strand, the wire strand is pressed from the first direction and the second direction opposing to each other, and from the third direction and the fourth direction opposing to each other and intersecting the first direction and the second direction, and wherein a force applied to the wire strand from the first direction and the second direction is larger than a force applied to the wire strand from the third direction and the fourth direction.

13. The method according to claim 12, the method comprising a first step of applying the force to the wire strand from the first direction and the second direction, and a second step applying the force to the wire strand from the third direction and the fourth direction after the first step.

* * * * *